United States Patent [19]
Rinn

[11] Patent Number: 6,008,902
[45] Date of Patent: Dec. 28, 1999

[54] METHOD AND DEVICE FOR HETERODYNE INTERFEROMETER ERROR CORRECTION

[75] Inventor: Klaus Rinn, Heuchelheim, Germany

[73] Assignee: Leica Microsystems Wetzlar GmbH, Wetzlar, Germany

[21] Appl. No.: 09/147,838

[22] PCT Filed: Jun. 17, 1997

[86] PCT No.: PCT/DE97/01223

§ 371 Date: Mar. 17, 1999

§ 102(e) Date: Mar. 17, 1999

[87] PCT Pub. No.: WO98/12499

PCT Pub. Date: Mar. 26, 1998

[30] Foreign Application Priority Data

Sep. 17, 1996 [DE] Germany .................. 196 37 777

[51] Int. Cl.⁶ .................................................. G41B 9/02
[52] U.S. Cl. ........................................ 356/349; 356/363
[58] Field of Search ................................ 356/345, 349, 356/363

[56] References Cited

U.S. PATENT DOCUMENTS

| | | | |
|---|---|---|---|
| 5,469,260 | 11/1995 | Takagi et al. | 356/358 |
| 5,631,736 | 5/1997 | Thiel et al. | 356/349 |
| 5,808,740 | 9/1998 | Tanaka et al. | 356/358 |
| 5,838,449 | 11/1998 | Katoet et al. | 356/363 |
| 5,894,370 | 4/1999 | Okuda et al. | 356/363 |

FOREIGN PATENT DOCUMENTS

| | | |
|---|---|---|
| 0 053 199 | 6/1982 | European Pat. Off. . |
| 0 623 802 | 11/1994 | European Pat. Off. . |
| 40 31 291 | 6/1992 | Germany . |
| 44 36 922 | 4/1996 | Germany . |

*Primary Examiner*—Robert H. Kim
*Attorney, Agent, or Firm*—Foley & Lardner

[57] ABSTRACT

A method and device for enabling determination of periodic errors of a heterodyne interferometer. According to the method, repeated calibration measurement occurs for a constant calibration distance divided up into two distance segments. One of the distance segments is measured with the interferometer and the other is measured by an additional measuring system and does not present a periodical error with regard to the distance measured. Before each calibration measurement the distance segment measured by the interferometer is modified slightly. The second distance segment is modified accordingly in the opposite direction. The sum of the distance segment modifications must correspond to at least one optical wave length of the interferometer around the measuring wave length. Using the various calibration measurement results for the constant calibration distance, the periodic error components are separated and a wavelength dependent error curve is determined in order to correct all interferometer measurements.

13 Claims, 2 Drawing Sheets

METHOD AND DEVICE FOR HETERODYNE INTERFEROMETER ERROR CORRECTION

BACKGROUND OF THE INVENTION

1. Field of the Invention

Precision interferometer measurements, as are, for example, needed for measurements on masks and wafers in the semiconductor industry, have a resolution of well below the laser wavelength. To this end, the phase shift is electronically interpolated. This creates errors which lie far beyond the resolution of the measuring arrangement and occur periodically.

2. Description of the Related Art

Commercial high-resolution interferometers all work using the heterodyne principle, the two frequency components used being split by different polarizations. Even here, a periodic error occurs along the distance measured, but this is less due to the inaccuracy of the electronic interpolation, rather it has its basis in mechanical stresses in the components through which the laser beam passes. These mechanical stresses produce stress birefringence in the optical components which interfere with the ideal polarization of the two beam components relative to one another.

Periodic errors are just some of a whole range of errors which considerably impair the resolution and reproduceability of high-resolution interferometers. Examples of known causes of error include the fluctuating wavelength of the laser, electronic errors, optical errors and atmospheric fluctuations in the surroundings of the measuring arrangement. Since, in recent years, it has been possible to increase the resolution of interferometers to a great extent, great inroads are also being made into the elimination of individual errors and their causes.

For example, U.S. Pat. No. 5,469,260 A describes a high-resolution interferometer as part of a device for measuring position, in which by substantial enclosure of the beam paths and controlled supply of gas with known temperature and composition, the effect of air-pressure fluctuations and short-term temperature changes on the result of the measurement is minimized. Periodic errors are, however, not addressed there.

The problem of periodic errors in interferometer measurements has, however, been known for a long time. The manufacturers of commercial interferometers have also dealt with the question of periodic errors in interferometer measurements. This problem has also been dealt with in the article "Nonlinearity in Interferometer Measurements" by Robert C. Quenelle, Hewlett Packard Journal, April 1983, page 10. Even here, the peak values of the periodic error are indicated with an order of magnitude of 5 nm. It has hitherto not been possible to correct this error. However, there was neither any great need to carry out such correction, since hitherto known precision interferometer arrangements still had resolving powers above this 5 nm limit and the periodic error could therefore be classed as negligible.

The object of DE 40 31 291 A1 was to improve the interpolation or, alternatively, to reduce systematic periodic errors which occur through optical polarization perturbations. To this end, a heterodyne double interferometer is provided in which the beam path is split and the measurement signals are detected separately. In order to make it possible to orient the polarization directions of the two elementary beams ideally orthogonally to one another, adjustable analyzers are arranged in front of the two measuring detectors. In this case it is possible to compensate for the periodic errors with an orthogonal arrangement of the analyzers, or alternatively, with a parallel arrangement of the transmission directions of the analyzers, increased resolution of the measurement can be achieved. The inaccuracy in the measurement of the heterodyne double interferometer can therefore be improved to the submicrometer range with this arrangement.

A disadvantage with the previously known measuring arrangement is that considerable changes to the interferometer structure compared with known structures are needed. Indeed, the additional incorporation of a beam splitter, of an additional detector for the two elementary beams and of two analyzers in existing interferometer structures is not straightforward merely on the grounds of space. Furthermore, periodic errors which result from the electronic interpolation remain unaffected. Therefore, using this method, the inaccuracy of the measurement can merely be improved to the submicrometer range.

New interferometer arrangements for ultraprecision measurements have since reached a resolving power of the order of magnitude of below one nanometer, so that there is a need to eliminate the periodic error as far as possible.

SUMMARY OF THE INVENTION

The object of the present invention, therefore, is to provide a method, and a device for carrying out the method, for correcting all periodic errors in interferometer measurements, which can be used with an unmodified interferometer structure and highest possible resolution.

This object is achieved according to the invention by the features described herein.

The invention is based on the fact that the observed error is periodic with a path-length variation in the optical path length of the interferometer by precisely one wavelength of the measuring light. The idea of the invention consists in comparing the measurement by the interferometer, which is affected by a periodic error, with another additional or complementary measurement which does not have any such periodic error. This is done in the form of a calibration measurement, with which a constant calibration distance is measured. To this end, for example, the constant position of a selected structure on an object to be measured relative to an arbitrarily chosen zero mark on this object to be measured is determined.

To do this, the calibration distance to the constant position of the selected structure is measured over a first segment of this calibration distance using the heterodyne interferometer, and the complementary second part of the calibration distance is measured using the additional distance-measuring system. The same constant calibration distance to the selected structure is then measured repeatedly for the purpose of calibration, the first distance segment, measured by the interferometer, always being increased by a small step before each measurement, and the second segment, measured by the additional distance-measuring system, changing accordingly. The distance portions measured by the two measuring systems must in sum always give the calibration distance. Whether the results of the measurements need to be added or subtracted depends in this case on the respective measuring arrangement and the chosen position of the zero mark on the object to be measured. Sign-dependent addition will therefore be referred to below. To control the procedure in the method steps described below and to detect and evaluate the measured values, the measuring arrangement is assigned a computer.

Since the measuring mirror in the measuring-beam path of the interferometer is fastened on a traveling table which carries the object to be measured, then the change in the distance to be measured by the interferometer is brought about by moving the table. The change in the distance measured by the interferometer is needed for the desired compilation of an error curve, and must therefore be measured using the additional distance-measuring system. As the additional measuring system in this method, it is basically possible to use any measuring instrument which does not itself have any periodic error of the described type and is suitable for the accurate measuring of small distances.

In an advantageous device, the object to be measured, with the structure selected for the calibration, may thus be projected, by means of a microscope objective, onto a position-measuring optical scanning system. The latter may, for example, be a CCD camera or a position-sensitive detector. If the selected structure is displaced by moving the table, the position-measuring optical scanning system can measure the lateral shift.

The invention can also be used if no position-measuring scanning system is used in the interferometer structure but instead even if, for example, the object to be measured which lies on the traveling table is projected onto a customary brightness detector which does not have spatial resolution. To this end, the object to be measured is connected to a micropositioning unit which has a displacement sensor and is arranged on the table. The object to be measured is then kept in a constant position relative to the brightness detector by using the micropositioning unit to displace the object to be measured, on the table, in the opposite direction and by an equal amount when the table is moved. In order to regulate this motion in the opposite direction, the signals from the brightness detector are employed. In this measuring arrangement, the displacement sensor is used to measure the displacement of the object to be measured on the table, which is equal and opposite to the travel of the table and therefore to the path-length change in the measuring-beam path of the interferometer. In this case, the displacement sensor of the micro-positioning system is thus the complementary distance-measuring system. In order to determine the calibration distance, the measurement value delivered by the displacement sensor is then added, with the corresponding sign, to the measurement result. The measurement of the calibration distance is repeated for different table positions.

The increase in the first segment of the calibration distance, which is measured using the interferometer, must in this case take place in sufficiently small steps. Furthermore, the total number of calibration measurements must be chosen to be sufficient to allow a correction curve to be mathematically compiled later. Furthermore, with the total increase in the distance segment measured by the interferometer during all the calibration measurements, at least one optical path-length change must be made in the measuring-beam path of the heterodyne interferometer of the order of magnitude of the wavelength of the measuring light.

The calibration measured values thus obtained for the constant calibration distance should ideally always have the same value. As a result of the stepwise increase in the optical path length of the measuring-beam path of the interferometer during the individual calibration measurements, however, the periodic error is brought to light. The calibration measured values determined are thus not constant, but exhibit deviations from a mean. In this case, the value of the periodic error is equal for successive equal values of the phase angle of the interferometer.

The errors periodic with the wavelength of the measuring light are then filtered from the calibration measured values using suitable mathematical methods, and an error curve as a function of the wavelength of the interferometer is calculated from this. The possible mathematical methods are dealt with at length in mathematics textbooks and will therefore not be described further here. Merely the examples of Fourier analysis or the calculation of a sine fit for those components of the calibration measured values for the calibration distance which are periodic with the wavelength of the measuring light will be mentioned here.

After this error curve has been compiled, any other measurements can then be corrected in accordance with the phase angle of the interferometer which is determined during the respective measurement. The error curve determined can be employed to correct the measured values so long as the causes of the periodic error, for example optical structure in the beam path of the interferometer, wavelength of the measuring light or the interpolation, remain constant and the information about the phase angle of the interferometer is not lost. If this is not the case, the error curve must be determined again.

Ultraprecision interferometer measurements, which are corrected with this novel method for correcting periodic errors in interferometer measurements, give resolution of the overall instrument in the sub-5 nm range reproduceability.

BRIEF DESCRIPTION OF THE DRAWINGS

The invention will be explained in more detail with reference to illustrative embodiments with the aid of the schematic drawings.

DETAILED DESCRIPTION OF THE ILLUSTRATIVE EMBODIMENTS

Figure 1:
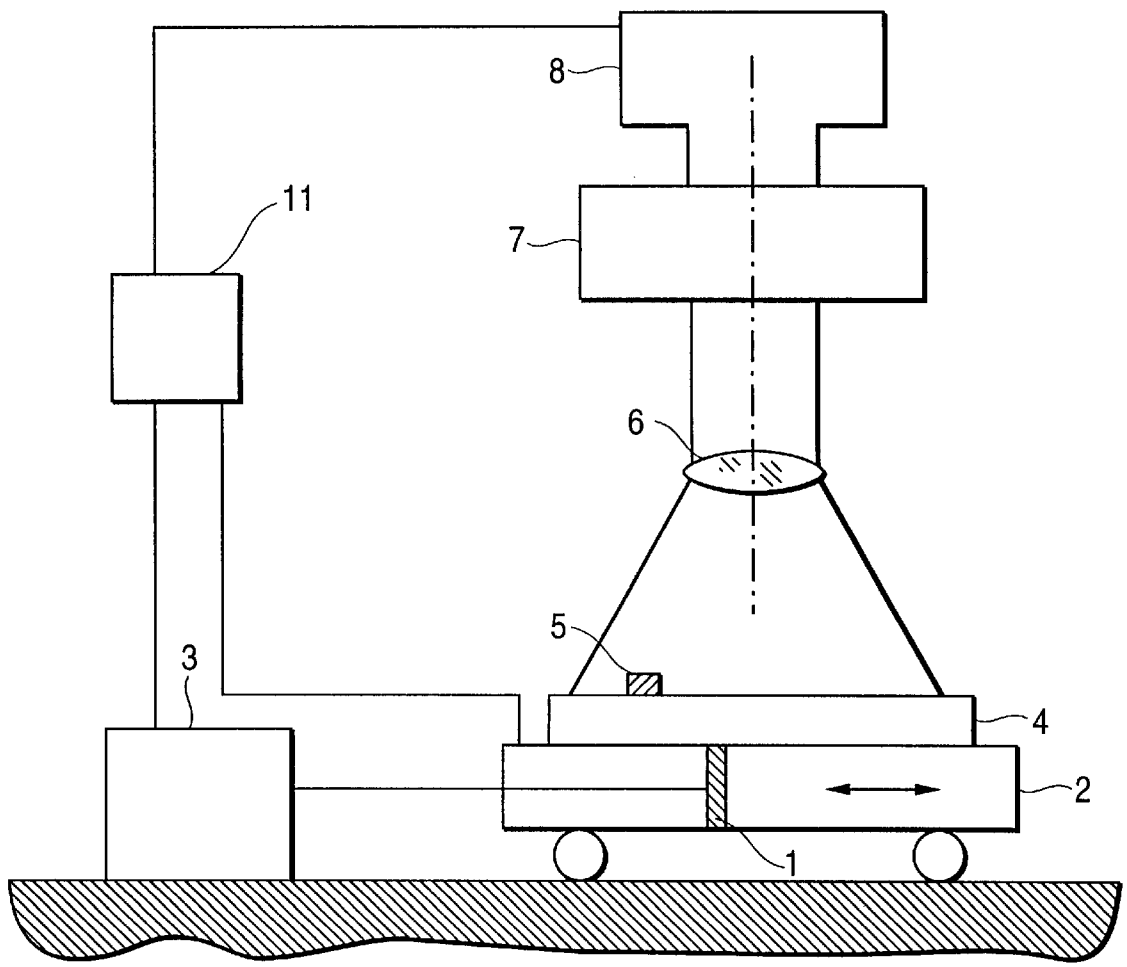
FIG. 1 shows an interferometer according to the invention with an additional CCD camera for application of the method according to the invention.

In FIG. 1, a measuring mirror 1 is mounted on a traveling table 2. The measuring mirror 1 is part of the measuring-beam path of a heterodyne interferometer 3. On the traveling table 2, there is an object 4 to be measured with a selected structure 5. This object 4 to be measured is observed using the objective 6 of a microscope (not further shown). The field of view of the objective 6 is projected onto a CCD camera 8. The position of the optical axis of the CCD camera 8 relative to the interferometer 3 is constant. In order to detect and evaluate the measured values and for controlling the procedure, the measuring arrangement is assigned a computer 11 which is electrically connected to the table 2, the interferometer 3 and the CCD camera 8.

At the start of the calibration measurements, the selected structure 5 is positioned, by moving the table 2, in the field of view of the objective 6 and the position of the structure 5 on the object 4 to be measured is determined.

To this end, a first distance segment as far as the measuring mirror 1 is measured using the interferometer 3. Using the CCD camera 8, the distance from the selected structure 5 to a chosen zero mark is measured as the complementary second distance segment of the calibration distance. From the measured value of the interferometric calibration measurement and the measured value of the complementary second calibration measurement, with the CCD camera, the calibration distance is determined by sign-dependent addition.

The table 2 is then moved a little, so that the calibration distance segment to be measured by the interferometer 3 is increased by a small amount. The segment of the calibration distance to the structure 5 to be measured by the CCD camera 8 changes accordingly. Then, in a further calibration measurement, the calibration distance is again determined from sign-dependent addition of the calibration measurement values for the first and second calibration distance segments. If a discrepancy results from this between the calibration measurement result from this calibration measurement and the result of the preceding calibration measurement, then this discrepancy involves an error, since, in both cases, the same structure with, therefore, also the same position on the object 4 to be measured has been measured.

Then, for a sufficient number of further calibration measurements, the table 2 is respectively moved a little in the same direction before the measurement, so that after all the calibration measurements have been taken, the table 2 has traveled at least a distance of the order of magnitude of the wavelength of the measuring light.

Although the position of the selected structure 5 on the object 4 to be measured is constant, constant measurement results are not found during the calibration measurements for the constant calibration distance. According to the periodic error in the interferometer measurement, which is found in the course of the calibration measurements with stepwise increasing length of the measuring-beam path in the interferometer 3, the calibration measured values show deviations from the constant value of the calibration distance. If the measuring-beam path in the interferometer 3 is increased by exactly one wavelength of the measuring light, then exactly one full period of the periodic error is found.

The measured values determined from the calibration measurements are then plotted against the travel of the table. The periodic error component of the measurement results is then separated using the aforementioned mathematical methods, for example Fourier analysis or a sine fit. From the error components calculated, an error curve as a function of the wavelength of the measuring light is compiled. Using this curve, the interferometer measured values in any further measurements on any structures are then corrected by the periodic error which is assigned to the interferometer phase angle determined.

Figure 2:
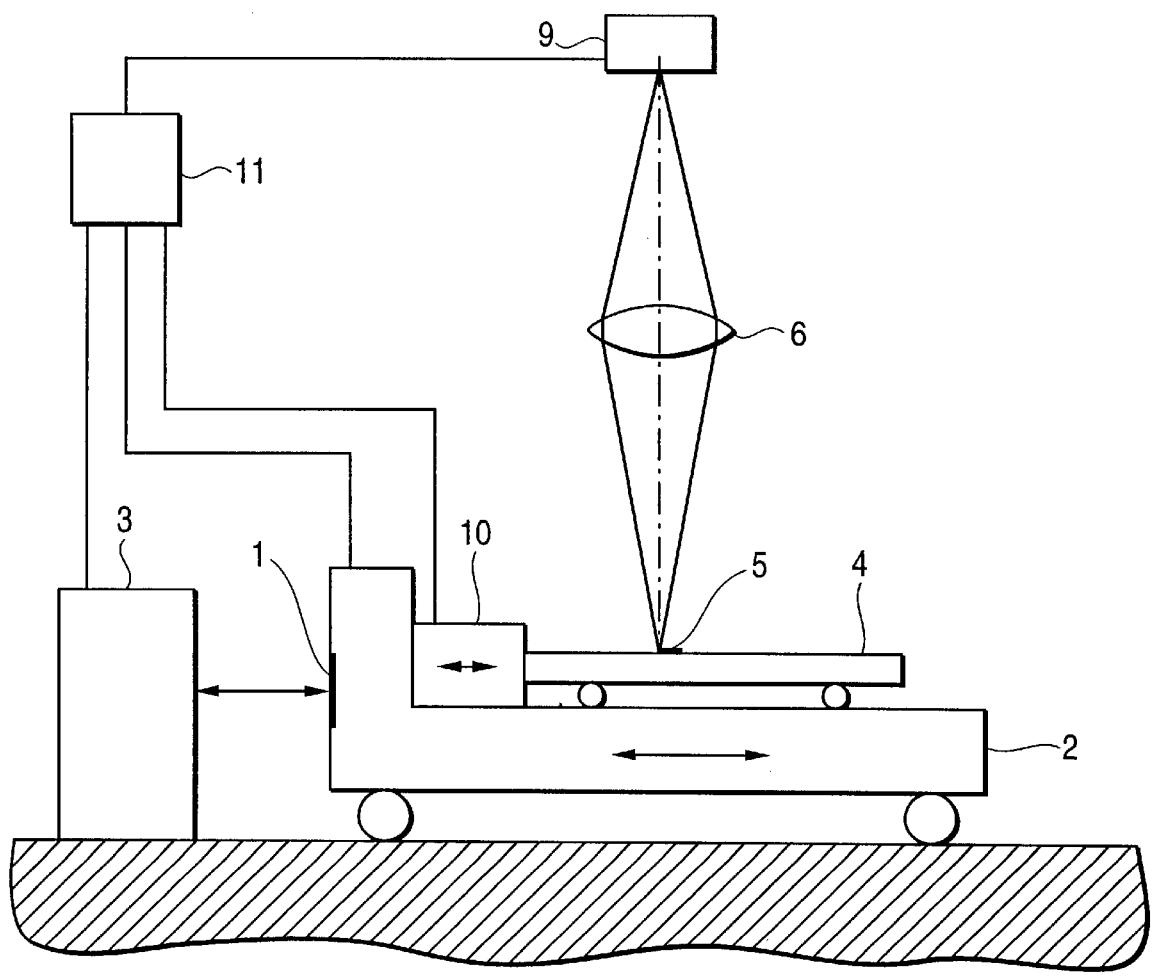
FIG. 2 shows an interferometer according to the invention with an additional micro-positioning system with displacement sensor for application of the method according to the invention.

In FIG. 2, a measuring mirror 1 is fitted on a traveling table 2. The measuring mirror 1 is part of the measuring-beam path of a heterodyne interferometer 3. There is an object 4 to be measured with a selected structure 5 on the traveling table 2. The selected structure 5 is projected using an objective 6 onto a brightness detector 9, and therefore delivers a defined intensity signal at the output of the brightness detector 9. A micropositioning unit 10 which has a displacement sensor and is connected to the object 4 to be measured and can displace the latter, is fitted on the table 2. The displacement sensor measures the displacement of the object 4 to be measured relative to its own zero mark and, in this structure, represents the additional distance-measuring system according to the invention. The position of the interferometer 3 and the brightness detector 9 relative to one another is constant. In order to detect and evaluate the measured values and to control the procedure, the measuring arrangement is assigned a computer 11 which is electrically connected to the table 2, the interferometer 3, the brightness detector 9 and the micropositioning unit 10.

If the object 4 to be measured is moved under the objective 6 using only the table 2, without operating the micropositioning unit 10, the various structures on the object 4 to be measured pass under the objective 6 and are successively projected onto the brightness detector 9. In this case, the brightness detector 9 records an intensity profile which is dependent on the travel of the table 2 and corresponds to the structures which have passed through. From this intensity profile, it is possible to determine the position of the structures which have passed through relative to any chosen zero mark.

The calibration measurement is carried out using a selected structure 5. The latter is projected onto the brightness detector 9 and produces a specific output signal there. By maintaining the output signal, the selected structure 5 on the object 4 to be measured is kept in a constant position relative to the brightness detector 9.

In the first calibration measurement, the first distance segment of the calibration distance, from the interferometer 3 to the measuring mirror 1, is measured using the interferometer 3. As the complementary second distance segment of the calibration distance, the displacement, measured by the displacement sensor of the micropositioning unit 10, of the object 4 to be measured relative to its zero mark, is measured. The calibration distance is determined by sign-dependent addition of the two calibration distance segments.

For the further calibration measurements of the calibration distance, the table 2 is moved a little before each measurement in the same direction, by means of which the first distance segment of the calibration distance, measured by the interferometer 3, is in each case increased a little. In order to keep the object 4 to be measured in a constant position relative to the brightness detector 9, a constant brightness signal from the brightness detector 9 must be regulated. To this end, when the table 2 is moved, the micropositioning unit 10 displaces the object 4 to be measured in the opposite direction on the table 2. The output signal of the brightness detector 9 is employed in order to regulate this motion in the opposite direction. The displacement of the object 4 to be measured on the table 2 which is carried out in each case and is measured by the displacement sensor of the micropositioning unit 10 is equal and opposite to the travel of the table 2 and therefore equal to the path-length change in the measuring-beam path of the interferometer 3. The displacement sensor therefore measures a correspondingly larger displacement of the object 3 [sic] to be measured relative to the zero mark as the complementary second distance segment of the calibration distance.

For repeated determination of the calibration distance, the measured value delivered by the displacement sensor of the micropositioning unit 10 is then in each case added, with the corresponding sign, to the measurement result of the interferometer 3.

The calibration measurements are repeated until the total resulting change in length of the first distance segment, measured by the interferometer 3, corresponds at least to the wavelength of the measuring light. The various measured values for the constant calibration distance, which are obtained from the calibration measurements, are then presented as a function of the travel of the table 2. Using a suitable mathematical method, the error components periodic with the wavelength of the measuring light are separated, and an error curve is calculated from this as a function of the wavelength of the measuring light.

Using the error curve, the measured values of the interferometer 3 are then corrected in any other measurements by the error component assigned to the phase angle determined for the interferometer 3.

List of References

1 Measuring mirror
2 Traveling table
3 Heterodyne interferometer
4 Object to be measured
5 Selected structure
6 Objective
7 Microscope tube
8 CCD camera
9 Brightness detector
10 Micropositioning unit with displacement sensor
11 Computer

What is claimed is:

1. Method for correcting errors of a heterodyne interferometer (3), characterized by the following steps:

a) calibration measurement of a constant calibration distance to a selected structure (5) on an object (4) to be measured, which lies on a traveling table (2) with a measuring mirror (1) fitted on it, by measuring a first segment, extending as far as the measuring mirror (1), of the calibration distance using the heterodyne interferometer (3) and measuring a complementary second segment of the calibration distance using an additional distance-measuring system which does not have any periodic error along the distance measured with the wavelength of the measuring light, b) repeating the calibration measurement of the constant calibration distance for a sufficient number of altered ratios between the first and the complementary second segments of the calibration distance, the changes in path length of the distance portions being chosen to be small in each case and the sum of the distance changes of a distance portion corresponding at least to an optical path-length change in the interferometer (3) of the order of magnitude of the wavelength of the measuring light, c) mathematically determining the periodic error component of the results of the calibration measurement for the constant calibration distance as an error curve as a function of the measuring-light wave-length of the interferometer, and d) correcting the interferometer measured values of any measurements of any structures by the error value assigned to the respective phase angle of the interferometer (3).

2. Method according to claim 1, characterized in that, in order to set different ratios between the first and second segments of the calibration distance, the table (2) with the measuring mirror (1) is moved by a small increment before each of the individual calibration measurements.

3. Method according to claim 2, characterized in that the selected structure (5) is detected with a position-sensitive detector and the complementary second segment of the calibration distance is measured using the position-sensitive detector.

4. Method according to claim 3, characterized in that the selected structure (5) is projected onto a position-measuring optical scanning system and the complementary second segment of the calibration distance is measured using the position-measuring optical scanning system.

5. Method according to claim 4, characterized in that a CCD camera is used as the position-measuring optical scanning system.

6. Method according to claim 2, characterized in that the selected structure (5) is projected onto a brightness detector (9) and the complementary second segment of the calibration distance is measured using a displacement sensor of a micropositioning unit (10) by which the object to be measured (4) with the selected structure (5) is displaced on the table (2) in the opposite direction and by an equal amount to the travel of the table (2), the micropositioning unit (10) being driven using the output signals of the brightness detector (9).

7. Method according to claim 1, characterized in that the mathematical determination of the periodic error component is carried out by a Fourier analysis of the results of the calibration measurement.

8. Method according to claim 1, characterized in that the mathematical determination of the periodic error component is carried out by sine-fitting the results of the calibration measurement.

9. A device for correcting errors of a heterodyne interferometer, comprising:

a heterodyne interferometer for measuring the displacement of a measuring mirror fastened to a movable table;

an object mounted on the table; and a computer for obtaining and evaluating the measured values for control of an error correcting process, wherein an additional distance measuring system is provided with an associated null mark and having no periodic error along the distance being measured, wherein an offset of a selected structure of the object from the null mark is determined in a defined position of the table, wherein a constant calibration length is provided as the sum of two contrarily variable length portions, wherein the measurement of the interferometer is associated with a first portion of the distance, and wherein the offset measurement obtained by the additional distance measuring system is associated with a second portion of the distance.

10. Device according to claim 9, further comprising a location-sensitive detector mounted thereto for detecting the position of the selected structure and for measuring the supplemental second portion of the calibration distance.

11. Device according to claim 10, characterized in that a position-measuring optical scanning system, onto which the selected structure (5) is projected using an objective (6), is fitted as the additional distance-measuring system (8).

12. Device according to claim 11, characterized in that a CCD camera is fitted as the position-measuring optical scanning system.

13. Device according to claim 9, further comprising a brightness detector integrated into the measuring structure on which the selected structure is projected using the objective, and as an additional measuring system, a distance recorder of a micropositioning unit mounted on the table and controlled by the output signal of the brightness detector is provided, which performs a displacement of the object which is contrary to the table's traveling movement.

* * * * *